United States Patent
Huynh Van et al.

(10) Patent No.: US 9,928,082 B1
(45) Date of Patent: Mar. 27, 2018

(54) METHODS AND SYSTEMS FOR REMOTE DEVICE CONFIGURATION

(71) Applicant: GLUE NETWORKS, INC., Sacramento, CA (US)

(72) Inventors: Olivier Huynh Van, Sacramento, CA (US); Mark Jonathan Wright, Colfax, CA (US)

(73) Assignee: Gluware, Inc., Sacramento, CA (US)

( * ) Notice: Subject to any disclaimer, the term of this patent is extended or adjusted under 35 U.S.C. 154(b) by 160 days.

(21) Appl. No.: 14/219,654

(22) Filed: Mar. 19, 2014

Related U.S. Application Data (60) Provisional application No. 61/803,205, filed on Mar. 19, 2013.

(51) Int. Cl.
*G06F 9/44* (2006.01)

(52) U.S. Cl.
CPC .................. *G06F 9/4416* (2013.01)

(58) Field of Classification Search
CPC .... G06F 9/44502; G06F 9/44508; G06F 1/24; G06F 9/44526; G06F 15/177; G06F 9/44514; G06F 9/44523; G06F 11/1417; G06F 9/44505
See application file for complete search history.

(56) References Cited

U.S. PATENT DOCUMENTS

| | | |
|---|---|---|
| 5,594,792 A | 1/1997 | Chouraki et al. |
| 6,061,721 A | 5/2000 | Ismael et al. |
| 6,105,131 A | 8/2000 | Carroll |
| 6,175,917 B1 | 1/2001 | Arrow |
| 6,286,038 B1 * | 9/2001 | Reichmeyer ........ H04L 41/0213 709/220 |
| 6,335,926 B1 | 1/2002 | Silton |
| 6,438,690 B1 | 8/2002 | Patel et al. |
| 6,513,159 B1 | 1/2003 | Dodson |
| 6,571,285 B1 | 5/2003 | Groath et al. |
| 6,640,251 B1 | 10/2003 | Wiget et al. |
| 6,715,073 B1 | 3/2004 | An et al. |
| 6,826,611 B1 | 11/2004 | Arndt |
| 6,879,679 B1 | 4/2005 | Ong |
| 6,892,300 B2 | 5/2005 | Carroll et al. |
| 6,931,526 B1 | 8/2005 | Bacha et al. |

(Continued)

FOREIGN PATENT DOCUMENTS

| | | |
|---|---|---|
| CN | 102315971 | 1/2012 |
| JP | 2000-209239 | 7/2000 |

(Continued)

OTHER PUBLICATIONS

International Search Report issued in International Application No. PCT/US2009/045155, dated Jul. 6, 2009.

(Continued)

*Primary Examiner* — Zahid Choudhury
(74) *Attorney, Agent, or Firm* — Mintz Levin Cohn Ferris Glovsky and Popeo, P.C.

(57) ABSTRACT

Systems and methods described herein may perform processing associated with loading, with a boot agent injection module in communication with a processor; a boot agent into a memory of a network device comprising a processor; and perform processing associated with using the boot agent to configure, with the network device, the network device to connect to a remote computer.

18 Claims, 6 Drawing Sheets

(56) References Cited

U.S. PATENT DOCUMENTS

| | | |
|---|---|---|
| 6,966,060 B1 | 11/2005 | Young et al. |
| 7,054,924 B1 | 5/2006 | Harvey et al. |
| 7,075,933 B2 | 7/2006 | Aysan |
| 7,305,479 B1 | 12/2007 | Morris et al. |
| 7,352,853 B1 | 4/2008 | Shen et al. |
| 7,373,661 B2 * | 5/2008 | Smith ............... H04L 63/0272 709/229 |
| 7,376,653 B2 | 5/2008 | Hart |
| 7,397,911 B2 | 7/2008 | Shen et al. |
| 7,409,709 B2 * | 8/2008 | Smith ............... H04L 12/4679 709/221 |
| 7,411,955 B2 | 8/2008 | Li et al. |
| 7,420,933 B2 | 9/2008 | Booth, III et al. |
| 7,447,901 B1 | 11/2008 | Sullenberger |
| 7,535,856 B2 | 5/2009 | Booth, III et al. |
| 7,593,352 B2 | 9/2009 | Verma |
| 7,600,011 B1 | 10/2009 | Urbanek |
| 7,602,737 B2 | 10/2009 | Asati et al. |
| 7,636,771 B2 | 12/2009 | Torii |
| 7,643,434 B2 | 1/2010 | Mandavilli et al. |
| 7,660,265 B2 | 2/2010 | Kreuk |
| 7,801,030 B1 | 9/2010 | Aggarwal et al. |
| 7,869,436 B1 | 1/2011 | Adler et al. |
| 7,940,916 B2 | 5/2011 | Baker et al. |
| 8,041,786 B2 | 10/2011 | Tindal et al. |
| 8,055,891 B2 | 11/2011 | Haustein et al. |
| 8,140,642 B1 | 3/2012 | Kadam et al. |
| 8,370,933 B1 | 2/2013 | Buckler |
| 8,693,371 B2 | 4/2014 | Duggan et al. |
| 8,701,078 B1 | 4/2014 | Holler et al. |
| 8,782,182 B2 | 7/2014 | Chaturvedi et al. |
| 8,819,202 B1 | 8/2014 | Carolan et al. |
| 8,849,973 B2 | 9/2014 | Leib et al. |
| 8,869,236 B1 | 10/2014 | Tonogai et al. |
| 9,037,969 B2 | 5/2015 | Wolff-Petersen et al. |
| 9,038,151 B1 | 5/2015 | Chua et al. |
| 9,178,807 B1 | 11/2015 | Chua et al. |
| 9,264,301 B1 | 2/2016 | Chua et al. |
| 9,276,877 B1 | 3/2016 | Chua et al. |
| 9,407,541 B2 | 8/2016 | Barabash et al. |
| 9,450,817 B1 | 9/2016 | Bahadur et al. |
| 2002/0112048 A1 | 8/2002 | Gruyer et al. |
| 2002/0184388 A1 | 12/2002 | Yaseen et al. |
| 2002/0186664 A1 | 12/2002 | Gibson |
| 2002/0191548 A1 | 12/2002 | Ylonen |
| 2003/0076837 A1 | 4/2003 | Whitehill et al. |
| 2003/0135508 A1 | 7/2003 | Chorafakis |
| 2003/0169730 A1 | 9/2003 | Narasimhan et al. |
| 2004/0028212 A1 | 2/2004 | Lok et al. |
| 2004/0059831 A1 | 3/2004 | Chu et al. |
| 2004/0078373 A1 | 4/2004 | Ghoneimy et al. |
| 2004/0083379 A1 | 4/2004 | Neuman et al. |
| 2004/0187127 A1 | 9/2004 | Gondi et al. |
| 2004/0261116 A1 | 12/2004 | Mckeown et al. |
| 2005/0022208 A1 | 1/2005 | Bolar et al. |
| 2005/0138634 A1 | 6/2005 | Luty et al. |
| 2005/0198221 A1 * | 9/2005 | Manchester ........ H04L 41/0213 709/220 |
| 2005/0256732 A1 | 11/2005 | Bauer et al. |
| 2006/0050862 A1 | 3/2006 | Shen et al. |
| 2006/0074732 A1 | 4/2006 | Shukla et al. |
| 2006/0080425 A1 | 4/2006 | Wood et al. |
| 2006/0112182 A1 | 5/2006 | Chen et al. |
| 2006/0180709 A1 | 8/2006 | Breton et al. |
| 2006/0184998 A1 | 8/2006 | Smith |
| 2006/0187854 A1 | 8/2006 | Booth, III et al. |
| 2006/0187855 A1 | 8/2006 | Booth, III et al. |
| 2006/0187856 A1 | 8/2006 | Booth, III et al. |
| 2006/0187937 A1 | 8/2006 | Townsley et al. |
| 2006/0190570 A1 | 8/2006 | Booth, III et al. |
| 2006/0206702 A1 | 9/2006 | Fausak |
| 2006/0248139 A1 | 11/2006 | Sundar |
| 2006/0259963 A1 | 11/2006 | Maxwell |
| 2006/0268829 A1 | 11/2006 | Nedeltchev |
| 2007/0011126 A1 | 1/2007 | Conner et al. |
| 2007/0115990 A1 | 5/2007 | Asati et al. |
| 2007/0130192 A1 | 6/2007 | Bolder et al. |
| 2007/0136788 A1 | 6/2007 | Monahan et al. |
| 2007/0165540 A1 | 7/2007 | Elias et al. |
| 2007/0206597 A1 | 9/2007 | Asati et al. |
| 2007/0253384 A1 | 11/2007 | Kanagala |
| 2007/0260575 A1 | 11/2007 | Robinson et al. |
| 2007/0271451 A1 | 11/2007 | Fluhrer |
| 2008/0037656 A1 | 2/2008 | Hannuksela |
| 2008/0052758 A1 | 2/2008 | Byrnes |
| 2008/0062997 A1 | 3/2008 | Nix |
| 2008/0075090 A1 | 3/2008 | Farricker |
| 2008/0117902 A1 | 5/2008 | Vinneras |
| 2008/0172440 A1 | 7/2008 | Jagannathan |
| 2008/0177868 A1 | 7/2008 | Zilbershtein et al. |
| 2008/0189757 A1 | 8/2008 | Schackow et al. |
| 2008/0232379 A1 | 9/2008 | Mohamed |
| 2008/0281953 A1 * | 11/2008 | Blaisdell ................ H04L 41/28 709/223 |
| 2008/0298367 A1 | 12/2008 | Furukawa |
| 2009/0044253 A1 | 2/2009 | Interlandi et al. |
| 2009/0046729 A1 | 2/2009 | Nagata |
| 2009/0059814 A1 | 3/2009 | Nixon et al. |
| 2009/0067440 A1 | 3/2009 | Chadda et al. |
| 2009/0073995 A1 | 3/2009 | Pandey et al. |
| 2009/0097417 A1 | 4/2009 | Asati et al. |
| 2009/0161679 A1 | 6/2009 | Yang |
| 2009/0254639 A1 | 10/2009 | Manchester |
| 2009/0282129 A9 | 11/2009 | Tindal |
| 2009/0304003 A1 | 12/2009 | Huynh |
| 2009/0304004 A1 | 12/2009 | Huynh Van et al. |
| 2010/0042725 A1 | 2/2010 | Jeon et al. |
| 2010/0054245 A1 | 3/2010 | Asati |
| 2010/0142410 A1 | 6/2010 | Huynh Van et al. |
| 2010/0180016 A1 | 7/2010 | Bugwadia |
| 2010/0226280 A1 * | 9/2010 | Burns ................ H04L 12/4633 370/254 |
| 2010/0226372 A1 | 9/2010 | Watanabe |
| 2010/0241698 A1 | 9/2010 | Hillerbrand |
| 2011/0013641 A1 | 1/2011 | Kolhi et al. |
| 2011/0176531 A1 | 7/2011 | Rune et al. |
| 2011/0276636 A1 | 11/2011 | Cheng et al. |
| 2011/0286384 A1 | 11/2011 | Sugimoto et al. |
| 2011/0289261 A1 | 11/2011 | Candelaria |
| 2012/0046058 A1 | 2/2012 | Vesterinen et al. |
| 2012/0057463 A1 | 3/2012 | Hurtta |
| 2012/0084423 A1 | 4/2012 | McGleenon |
| 2012/0089700 A1 | 4/2012 | Safruti et al. |
| 2012/0218993 A1 * | 8/2012 | Masaki ............... H04L 12/5696 370/389 |
| 2012/0250516 A1 | 10/2012 | Aggarwal et al. |
| 2012/0265324 A1 | 10/2012 | Colombo et al. |
| 2013/0060929 A1 | 3/2013 | Koponen et al. |
| 2013/0085914 A1 | 4/2013 | McPherson |
| 2013/0117427 A1 | 5/2013 | Amano et al. |
| 2013/0223442 A1 | 8/2013 | Narayanan et al. |
| 2013/0279336 A1 | 10/2013 | Woelker |
| 2014/0052877 A1 | 2/2014 | Mao |
| 2014/0136394 A1 | 5/2014 | Messina et al. |
| 2014/0143419 A1 | 5/2014 | Vyatkin et al. |
| 2014/0169158 A1 | 6/2014 | Mishra et al. |
| 2014/0223530 A1 | 8/2014 | Nedeltchev et al. |
| 2014/0282628 A1 | 9/2014 | Pruss et al. |
| 2014/0371941 A1 | 12/2014 | Keller et al. |
| 2014/0372617 A1 | 12/2014 | Houyou et al. |
| 2015/0023210 A1 | 1/2015 | Kis |
| 2015/0058412 A1 | 2/2015 | Hillerbrand |
| 2015/0169345 A1 | 6/2015 | DeCusatis et al. |
| 2015/0172195 A1 | 6/2015 | DeCusatis et al. |
| 2015/0188772 A1 | 7/2015 | Gasparakis |
| 2015/0229709 A1 | 8/2015 | Pruss et al. |
| 2015/0347175 A1 | 12/2015 | DeCusatis et al. |
| 2016/0036636 A1 | 2/2016 | Erickson et al. |
| 2016/0057207 A1 | 2/2016 | Li et al. |
| 2016/0112246 A1 | 4/2016 | Singh et al. |
| 2016/0112269 A1 | 4/2016 | Singh et al. |
| 2016/0127181 A1 | 5/2016 | Li et al. |

(56) References Cited

U.S. PATENT DOCUMENTS

2016/0142243 A1 5/2016 Karam et al.
2016/0255051 A1 9/2016 Williams et al.
2016/0381124 A1 12/2016 Hwang et al.

FOREIGN PATENT DOCUMENTS

| JP | 2011-199623 | 10/2011 |
|---|---|---|
| WO | WO-2004/090672 | 10/2004 |
| WO | WO-2013/093702 | 6/2013 |
| WO | WO-2013/177311 | 11/2013 |

OTHER PUBLICATIONS

Written Opinion issued in International Application No. PCT/US2009/045155, dated Jul. 6, 2009.
International Search Report issued in International Application No. PCT/US2009/045159, dated Aug. 24, 2009.
Written Opinion issued in International Application No. PCT/US2009/045159, dated Aug. 24, 2009.
International Search Report issued in International Application No. PCT/US2009/045159, dated Sep. 24, 2009.
Written Opinion issued in International Application No. PCT/US2009/045159, dated Sep. 24, 2009.
B. Weis, "Group Domain of Interpretation (GDOI) Support for RSVP", MSEC Working Group, Internet-Draft, Jun. 21, 2007 [retrieved Aug. 15, 2009], http://www.watersprings.com/pub/id/draft-weis-gdoi-for-rsvp-00.txt.
International Search Report issued in International Application No. PCT/US2009/067384, dated Jul. 20, 2010.
Written Opinion issued in International Application No. PCT/US2009/067384, dated Jul. 20, 2010.
"OSGI Alliance", printed from http://www.osgi.org, on Sep. 26, 2014 (2 pages).
"Equinox Framework QuickStart Guide" printed from http://www.eclipse.org/equinox/documents/quickstart-framework.php, on Sep. 26, 2014 (5 pages).
"Human Machine Interface machine interface, on (HMI)" httpL//en.wikipedia.org/wiki/Human-machine_interface, on Sep. 26, 2014, Last updated Sep. 20, 2014 (2 pages).
File History of U.S. Appl. No. 12/471,179.
File History of U.S. Appl. No. 12/471,199.
File History of U.S. Appl. No. 14/325,7570.
Cisco, "Cisco IOS IP Routing: BFD Configuration Guide", Release 15.1, 2010, Cisco System, Inc. retrieved from http://www.cisco.com/cl/en.us/td/docs/ios/iproute_bfd/configuration/guide/15_1/irb_15_1_book.pdf, 110 pages.
Oscar Mejia, "How to Create a Command Line Program with NodeJS", Aug. 5, 2012, retrieved from https://web.archive.org/web/20130314232203/http://oscar-mejia.com/blog.how-to-create-a-command-line-program-with-nodejs/ (8 pages).
George Ornbo, "Command Line Utilities with Node.js", Jan. 2, 2014, retrieved from http://shapeshed.com/commandlineutilitieswithnodejs/ (4 pages.
"Command Line JavaScript", Oct. 15, 2012, retrieved from http://web.archive.org/web/20121015021129/http://javascript.cs.lmu.edu.notes/commandlinejs (8 pages).
File History of U.S. Appl. No. 12/634,536.
File History of U.S. Appl. No. 13/830,801.
English language abstract of CN-102315971 published Jan. 11, 2012.
English language abstract of JP-2000-209239 published Jul. 28, 2000.
English language abstract of JP-2011-199623 published Oct. 6, 2011.
File History of U.S. Appl. No. 13/830,737.
File History of U.S. Appl. No. 14/017,696.
File History of U.S. Appl. No. 14/219,685.
File History of U.S. Appl. No. 14/325,757.
File History of U.S. Appl. No. 14/490,424.
File History of U.S. Appl. No. 14/997,119.
File History of U.S. Appl. No. 15/056,776.
File History of U.S. Appl. No. 15/078,267.

* cited by examiner

METHODS AND SYSTEMS FOR REMOTE DEVICE CONFIGURATION

CROSS-REFERENCE TO RELATED APPLICATIONS

This application claims the benefit of U.S. Provisional Patent Application No. 61/803,205, filed Mar. 19, 2013, which is incorporated by reference in its entirety.

DETAILED DESCRIPTION OF SEVERAL EMBODIMENTS

Many network devices, such as routers or switches, may require configuration in order to function. For example, in the context of a complex, secure corporate network, the network devices may be configured to interact with one another. Systems and methods described herein may enable a network device to be provisioned with a complex configuration in a zero touch manner by causing a boot agent to be loaded on the network device. Once the boot agent has been loaded, it may enable the network device to connect to a provisioning engine, which may be part of a data center, for example. The provisioning engine may take over and fully provision the device. This provisioning may be accomplished without trained IT staff at the remote network device location.

Systems and methods described herein may comprise one or more computers. A computer may be any programmable machine capable of performing arithmetic and/or logical operations. In some embodiments, computers may comprise processors, memories, data storage devices, and/or other commonly known or novel components. These components may be connected physically or through network or wireless links. Computers may also comprise software which may direct the operations of the aforementioned components. Computers may be referred to with terms that are commonly used by those of ordinary skill in the relevant arts, such as servers, PCs, mobile devices, routers, switches, data centers, and other terms. Computers may facilitate communications between users and/or other computers, may provide databases, may perform analysis and/or transformation of data, and/or perform other functions. It will be understood by those of ordinary skill that those terms used herein are interchangeable, and any computer capable of performing the described functions may be used. For example, though the term "router" may appear in the following specification, the disclosed embodiments are not limited to routers.

Computers may be linked to one another via a network or networks. A network may be any plurality of completely or partially interconnected computers wherein some or all of the computers are able to communicate with one another. It will be understood by those of ordinary skill that connections between computers may be wired in some cases (i.e. via Ethernet, coaxial, optical, or other wired connection) or may be wireless (i.e. via Wi-Fi, WiMax, or other wireless connection). Connections between computers may use any protocols, including connection oriented protocols such as TCP or connectionless protocols such as UDP. Any connection through which at least two computers may exchange data can be the basis of a network.

The systems and methods described herein may be related to the teachings of U.S. patent application Ser. No. 12/634,536, "SYSTEM AND METHOD FOR PROVIDING VIRTUAL PRIVATE NETWORKS" filed Dec. 9, 2009 (published as US 2010/0142410); U.S. patent application Ser. No. 12/471,199, "REGIONAL VIRTUAL VPN" filed May 22, 2009 (published as US 2009/0304004); and U.S. patent application Ser. No. 12/471,179, "GLOBAL VIRTUAL VPN" filed May 22, 2009 (published as US 2009/0304003), the entirety of each of which is incorporated by reference herein.

Figure 1:
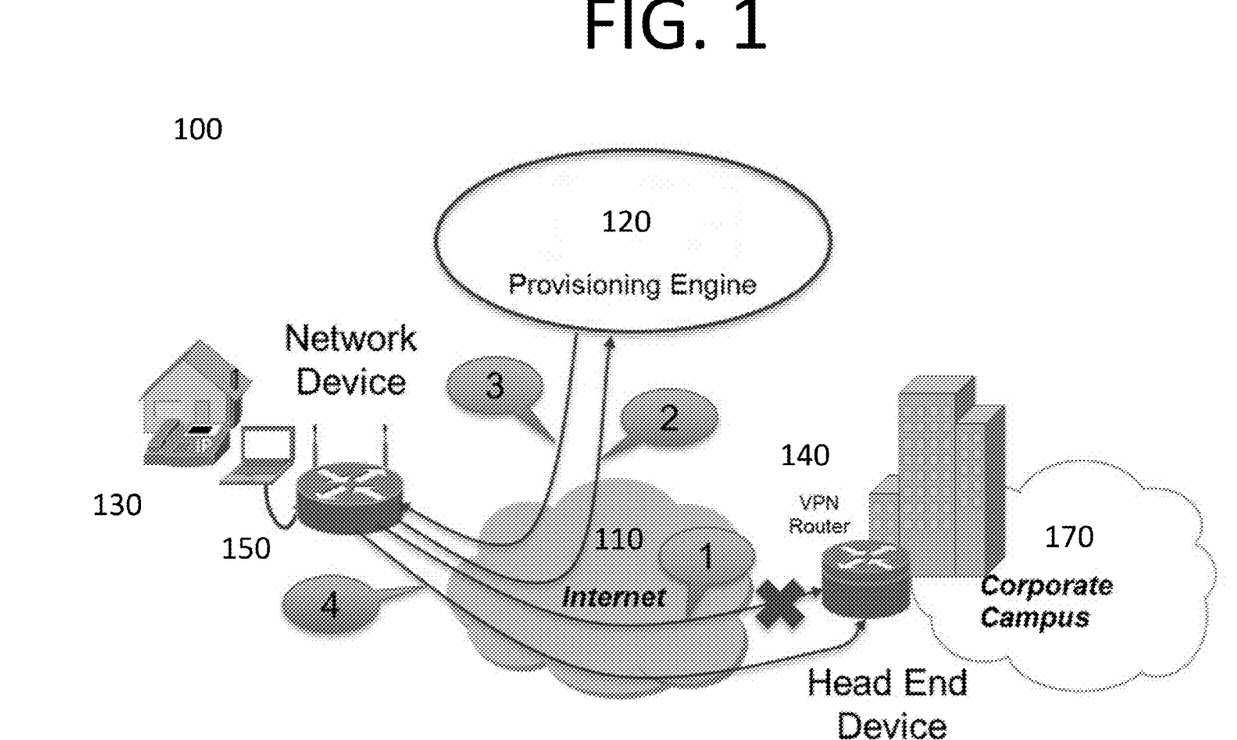
FIG. 1 is a network according to an embodiment of the invention.

FIG. 1 is a network 100 according to an embodiment of the invention. In this example, various devices such as the head end device 140 and the network device 150 may communicate with one another via the internet 110 or some other public or private network. In FIG. 1, the head end device 140 is a VPN router and the network device 150 is a router, although other head end devices 140 and/or network devices 150 may be used. When they are connected to one another via the internet 110, the head end device 140 and the network device 150 may facilitate communication between head end computers 170 associated with the head end device 140 (e.g., corporate campus computers and/or a local secure campus network) and home computers 130 associated with the network device 150 (e.g., remote IP phones, PCs, etc.). As will be described in greater detail below, a provisioning engine 120 may be used to set up the network device 150 so that it can communicate with the head end device 140.

In the network 100 shown in FIG. 1, an example remote provisioning process for the network device 150 may proceed as follows. In 1, the network device 150 is not connected to the secure corporate network via the head end device 140 but is connected to the internet 110. In 2, a provisioning process may be initiated. For example, the provisioning process may employ one of two methods. In a first method, an end user may install a USB key on the network device 150 and power on the network device 150. The USB key may automatically configure the network device 150 to contact the provisioning engine 120. In a second method, the end user may connect a PC or other device 130 to the network device 150 via one of the LAN ports on the network device 150 or in some other way. The user may access their email, open a configuration email, and click on a configuration URL. This action may launch a Java applet that may automatically configure the network device 150 to contact the provisioning engine 120. The Java applet may be started via a link or program provided to the PC 130 in some other way as well. Both of these methods are described in greater detail below. In 3, the provisioning engine 120 may configure the network device 150 based on specific configuration information to complete the provisioning. In 4, the provisioned network device 150 may now be part of the secure corporate network and may communicate with the head end device 140 accordingly.

Figure 2:
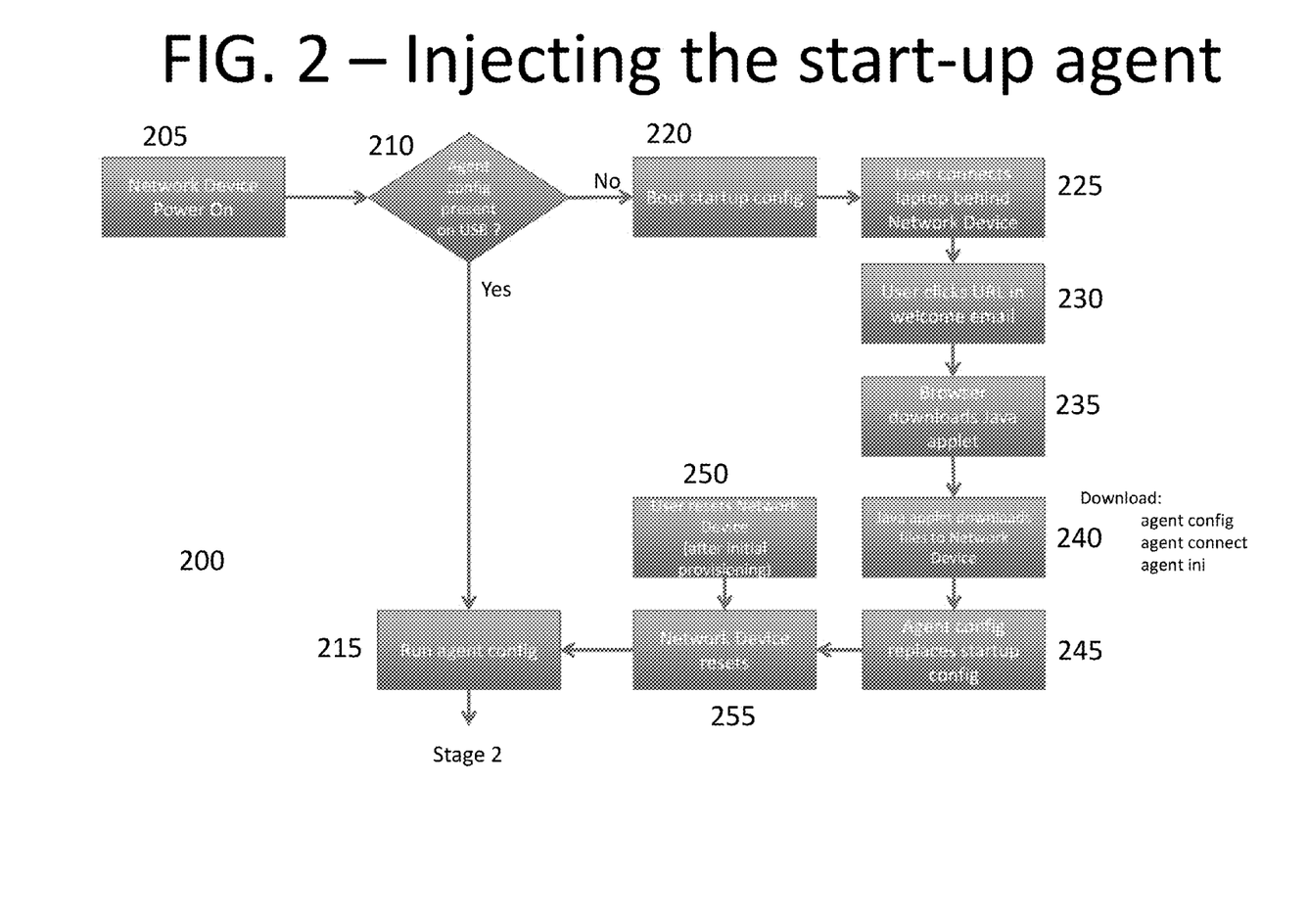
FIG. 2 is an injection method according to an embodiment of the invention.

FIG. 2 is an injection method 200 according to an embodiment of the invention. In 205, the network device 150 may power on. When a network device 150 powers on it may follow a set boot sequence. For example, a boot sequence may be as follows. First, the network device 150 may execute a POST (power on self test). Then, the network device 150 may load operating system software. The operating system software may look for a valid configuration file stored in a memory such as an NVRAM. Configuration files may be labeled startup-config or startup.cfg, for example. If a startup-config file is in NVRAM, the network device 150 may load and run this file. However, many network devices 150 may include a mechanism to allow for this boot sequence to be overridden. The method 200 may take advantage of this mechanism by loading a config file onto the network device 150 to act as a boot agent to allow remote provisioning of the network device 150. The agent-boot.cfg agent can be injected onto the network device from a USB key or over an internet connection, for example.

In 210, when the startup.cfg runs it may look for the presence of a boot agent configuration file (indicated throughout by "agent-boot.cfg", although other file names may be used) on a USB key. The USB key may also hold additional files, for example an agent-connect file and agent-boot.ini file, which are described in greater detail below. If no USB key is found, or if the agent-boot.cfg file is not found on the USB key, in 220 the startup.cfg may continue to run and the network device 150 may power up with basic, unsecured, un-configured Internet access. If the agent-boot.cfg file is found on the USB key, in 215 the network device 150 may execute that config (cfg) file and may not continue with the default startup.cfg. Execution of the boot agent config file is described in greater detail below with respect to FIG. 3.

If no USB key is present, in 220 the network device 150 may boot the startup.cfg file and configure basic internet access. Once the network device 150 has basic internet connectivity, in 225 another computer 130 may begin interfacing with the network device 150. For example, an end user may connect a laptop to one of the LAN ports on the network device 150 and then access their email on the laptop. The user may have been sent an email with instructions containing a URL. The user may be instructed to click on the URL. In response, in 230 the computer 130 may connect to a web server in a data center. In 235, the URL may cause a web page to be displayed and a Java applet or other executable program to be downloaded and executed. In some embodiments, the Java applet may be obtained and executed in some other fashion. In 240, the Java applet may download the agent-boot.cfg, and, in some embodiments, the agent-connect script and agent-boot.ini files to a memory in the network device 150, for example a flash memory. In 245, the Java applet may then overwrite the startup.cfg file with the agent-boot.cfg. Then, in 255, the Java applet may cause the network device 150 to reset. When the network device 150 resets, it may follow its standard boot process but because the startup.cfg has been replaced by agent-boot.cfg, in 215 the network device 150 may execute agent-boot.cfg. Once the boot agent config file is installed in 245, if, in 250, the network device 150 executes a hard reset, it will boot with the custom agent-boot.cfg config.

Figure 3:
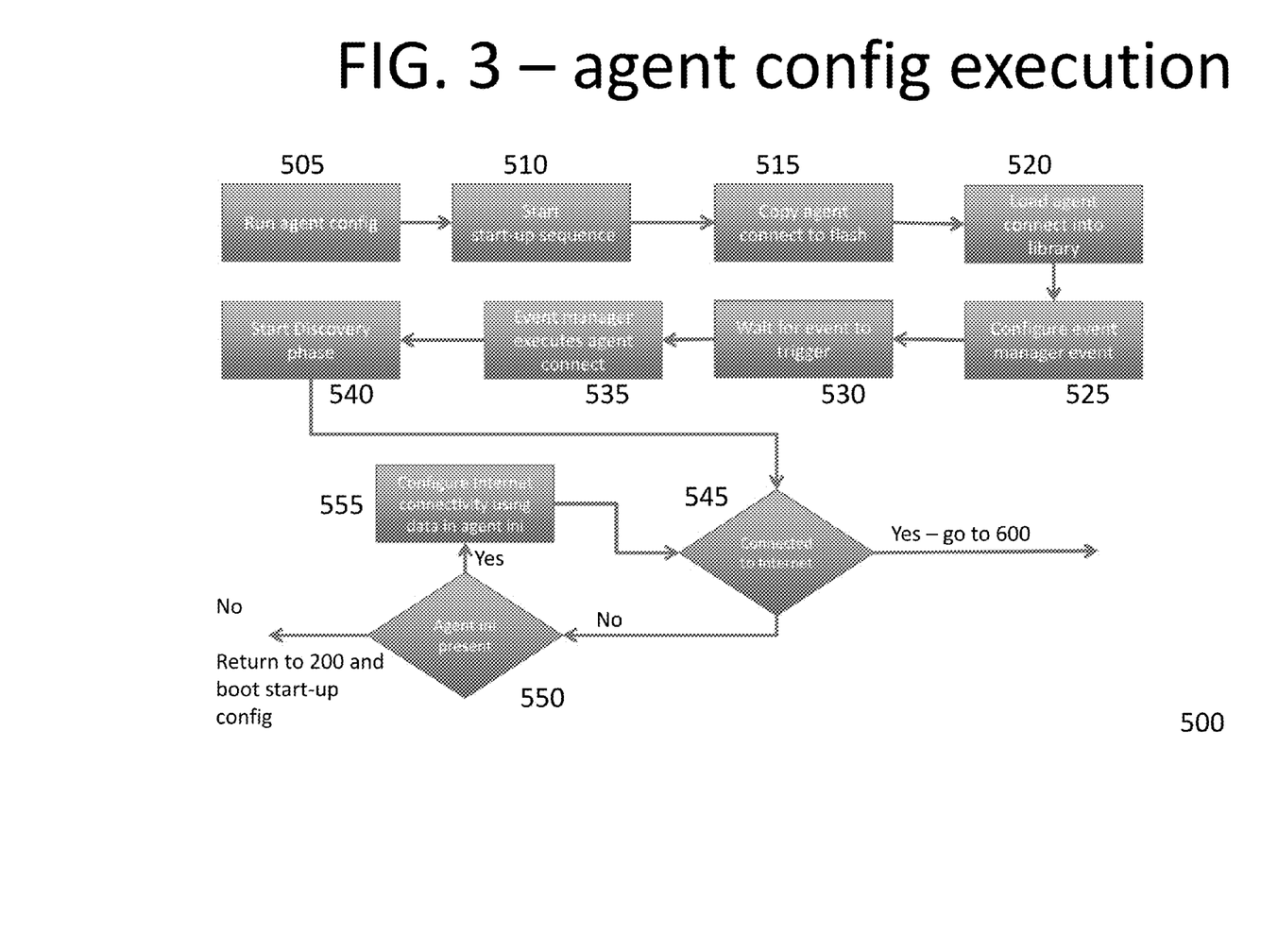
FIG. 3 is a configuration method according to an embodiment of the invention.

FIG. 3 is a configuration method 500 according to an embodiment of the invention. In 505 the network device 150 may run the boot agent config file, and in 510 the network device 150 may begin a start up sequence. Once the network device 150 starts to execute the agent-boot.cfg, regardless of how the agent was injected onto the network device 150, in 515 the network device 150 may load the agent-connect script into flash memory, if this has not already been done. Once the agent-connect script is loaded into flash, in 520 a command may be executed to load this script into a network device 150 library. In 525, the network device 150 may be set up to create an event manager event and to configure the event management event to call the agent-connect script. The agent-boot.cfg file may be careful to configure an event that will always trigger. In 530, the network device 150 may wait for the event to trigger. Once the event is triggered, in 535 the event manager may cause the network device 150 to execute the agent-connect script. In 540, the agent-connect script may initiate a discovery phase, wherein it may gather information about the network device 150. For example, the information may include, but is not limited to, the IP address the network device 150 has been assigned, whether the network device 150 it routable or behind NAT, the network device 150 model number, the operating system image that is loaded on the network device 150, the network device 150 serial number, and the options installed or licensed for the network device 150.

Once the discovery phase is complete and the information about the network device 150 is known, in 545 the script may determine if the network device 150 is connected to the internet. If it is connected to the internet, a provisioning method such as that described below with respect to FIG. 4 may begin. If the network device 150 has no internet connectivity (which may happen in the USB scenario, for example), it could be because the network device 150 needs some basic configurations to be set prior to being able to connect. For example, configuration may be required if the network configuration requires the network device 150 to have a fixed IP address to be able to connect to the public internet (i.e., the the network device 150 has no DHCP capability to assign the IP address when it connects), or if the network device 150 has a DSL connection to the internet rather than an ethernet connection (in this case DSL credentials may be required before the network device 150 can connect), or if the connection to the internet is over 3G or LTE wireless.

When no Internet connection is detected, in 550 the script looks for a boot agent initialization file that may have been injected as described above. In this example the file is called agent-boot.ini, although other file names may be possible. This file may contain the information required to be able to setup basic internet connectivity, for example the static IP address that must be injected onto the network device 150, or the DSL credentials required to get DSL service. If no agent ini file is found, the network device 150 may return to the injection process 200 described above and make another attempt to get the needed files. If the agent ini file is found, in 555 the network device 150 may configure internet connectivity using the data from the agent ini file. Then, in 545, the network device 150 may determine whether it is connected to the internet and move on to provisioning if so.

The agent-boot.cfg file and the agent-connect script may be generic files which may be used in all scenarios. The agent-boot.ini may be customized and injected on a case by case basis for each network device 150. This may be done automatically as follows. When a request is made, for example to a data center, to create a new network device 150, a workflow engine may detect if the configuration uses a standard ethernet network device 150 or a variant using DSL or 3G. It may also detect whether the network device 150 will have a dynamic IP address or will require a static address. If the configuration is for a standard ethernet network device 150 with dynamic IP, then no special data may be required for the agent-boot.ini. If the network device 150 requires DSL, 3G, a fixed IP address, and/or some other special configuration, a specific cvo-boot.ini file may be generated and injected along with the agent-boot.cfg and agent-connect files.

Once agent-connect has processed the agent-boot.ini data to set any custom settings for the network device 150, the network device 150 should have internet connectivity and can start provisioning, as described below.

Figure 4:
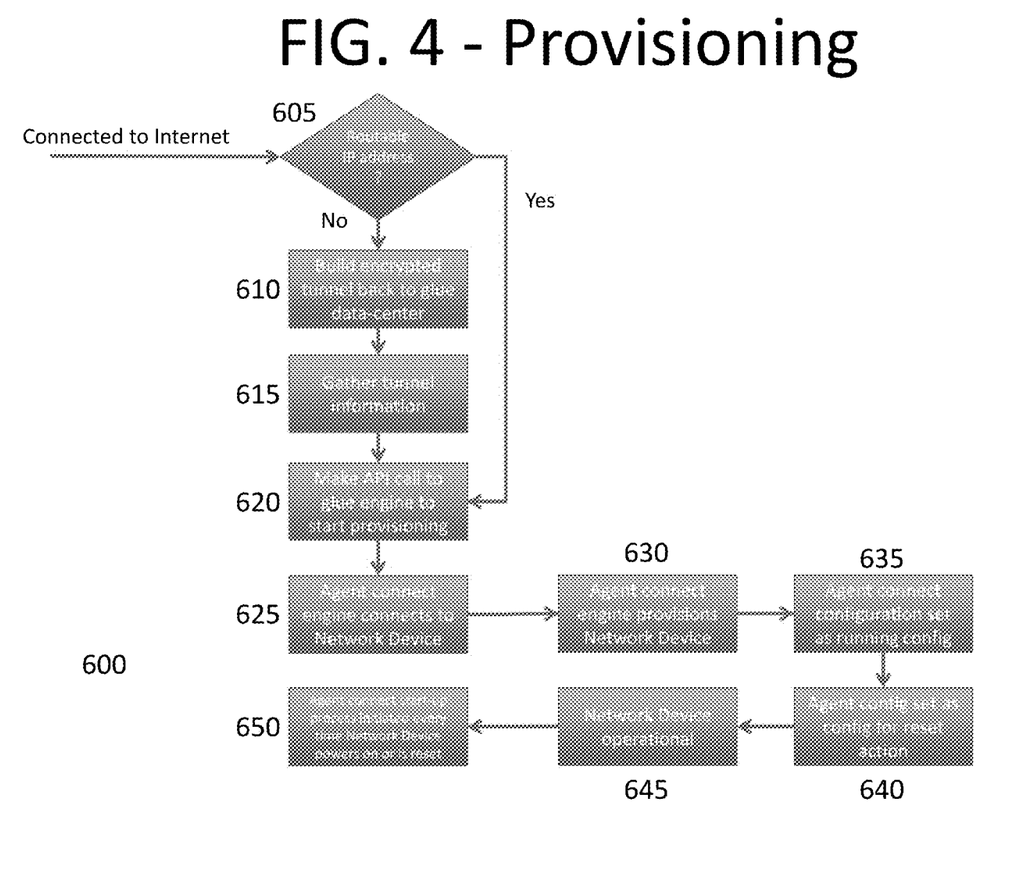
FIG. 4 is a provisioning method according to an embodiment of the invention.

FIG. 4 is a provisioning method 600 according to an embodiment of the invention. If the network device 150 is connected to the internet, in 605 the network device 150 may determine if it has a public routable IP address (i.e., it is connected directly to the public internet, for example) or if it has a private address (i.e. it is connected behind a NAT router that is a gateway to the public internet, for example). If the the network device 150 has a private address, it may initiate a process to build a secure, encrypted, tunnel to a data center. For example, in 610 the network device 150 may build the tunnel, and then in 615 the network device 150 may gather tunnel information. Once that encrypted tunnel has been built out from behind the NAT router to the data center, two way communications between the network device 150 and the data center may be possible. At this stage, or if the network device 150 has a public routable IP address, in 620 the script may make a call to the data center including a request to start provisioning. In the case where a tunnel has been built, the call may be made through the encrypted tunnel. If the network device 150 has a public IP address, the call may be made via the internet and may include the IP address at which the network device 150 can be reached. The data center may comprise the provisioning engine 120, which may perform the functions of the data center described below.

Once the request to the data center for the provisioning to start has been made, the data center may take over and dynamically build and download the configuration required by the network device 150 based upon a template that was specified in the portal and the information determined in the discovery phase. For example, in 625 an agent connect engine may connect to the network device 150. In 630, the agent connect engine may provision the network device 150. In 635, an agent connect configuration may be set as a running config. The running configuration may be loaded whenever the network device 150 is powered on or reset. In 640, the agent config may be set as a config for a reset action. Thus, agent-boot.cfg config may be the config that will be loaded whenever the network device 150 is made to perform a hard reset, for example. These processes are described in greater detail in U.S. patent application Ser. No. 12/634,536, "SYSTEM AND METHOD FOR PROVIDING VIRTUAL PRIVATE NETWORKS" filed Dec. 9, 2009 (published as US 2010/0142410). In 645, it may be determined that the network device 150 is operational. At this point, the network device 150 may be fully provisioned and may now be part of a secure corporate network. In case of future network device 150 power on or reset, in 650 the agent connect start up process may be initiated. Whenever the network device 150 powers on or has hard reset, it may follow the provisioned boot process and may connect back to the data center to check if it has the correct configuration or if any config updates are available.

The provisioning engine 120 may comprise a library of scripts (methods, applications, APIs, etc.) which may be used in the agent-connect script to interact with the network device 150 and the data center. These scripts may use encrypted traffic between the network device 150 and the data center so that data can be exchanged, requests can be made, and so that status information can be passed back to the data center for monitoring and logging purposes. These scripts may provide an API into the data center that can be used by the script to access capabilities of the data center.

Figure 5:
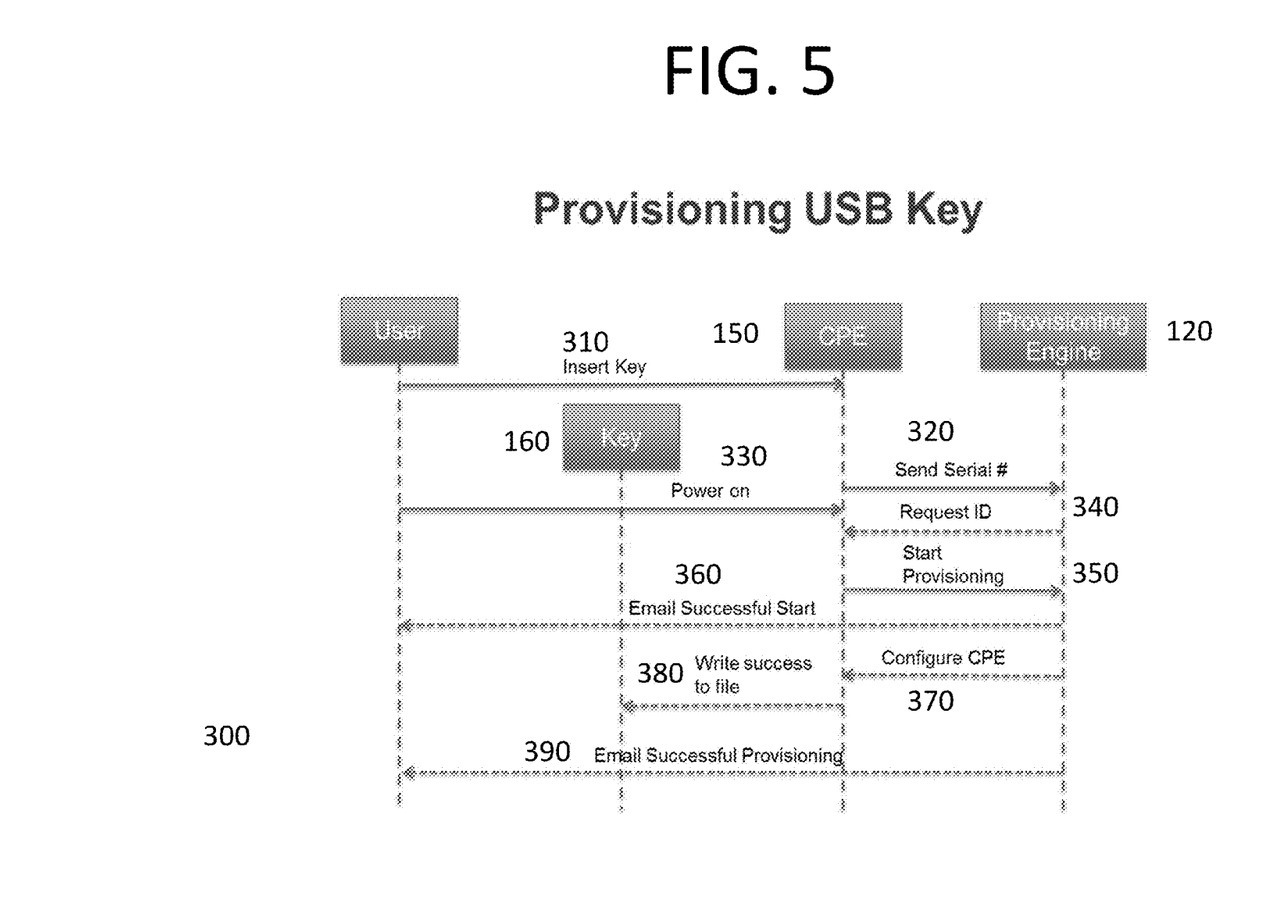
FIG. 5 is a provisioning method according to an embodiment of the invention.

FIG. 5 is a provisioning method 300 according to an embodiment of the invention. This method 300 is an overview of the provisioning described above for an embodiment employing a USB key injection process. In 310 a user may insert the USB key 160 into the network device 150. In 320 the serial number of the key 160 may be sent to the provisioning engine 120, and in 330 the network device 150 may be powered on. In 340, the provisioning engine may request an ID from the network device 150. In 350, the network device 150 may provide the ID and the provisioning engine 120 may start provisioning as described above. In 360, the provisioning engine 120 may inform the user of a successful start to the provisioning, for example via email. In 370, the provisioning engine 120 may configure the network device 150 as described above. In 380, the network device 150 may store an indication of successful configuration in the USB key 160. In 390, the provisioning engine 120 may inform the user of a successful provisioning, for example via email.

Figure 6:
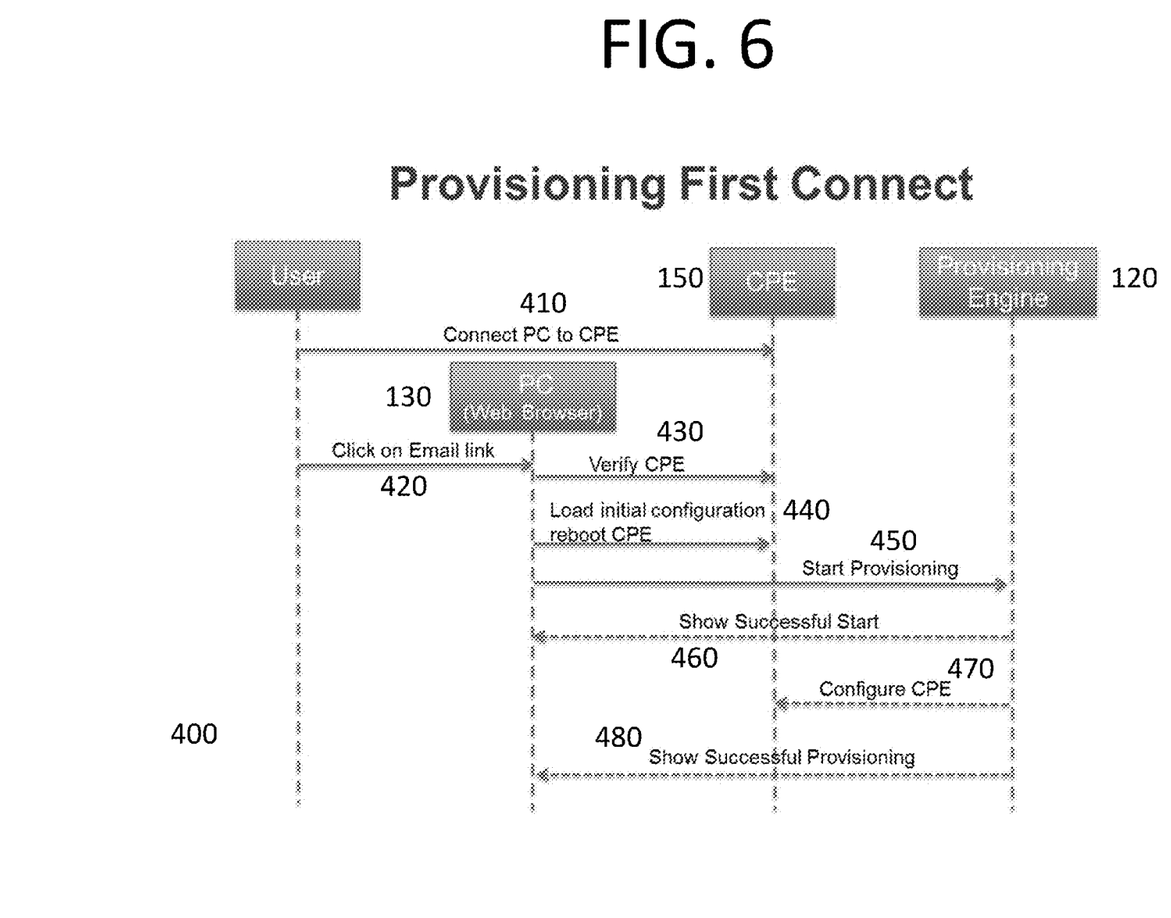
FIG. 6 is a provisioning method according to an embodiment of the invention.

FIG. 6 is a provisioning method 400 according to an embodiment of the invention. This method 400 is an overview of the provisioning described above for an embodiment employing a network based injection process. In 410 a user may connect a PC 130 or other computer to the network device 150. In 420 the user may initiate the process, for example by clicking on a link as described above. In 430 the PC 130 may verify the network device 150. In 440, the initial configuration may be loaded into the network device 150, and the network device 150 may be rebooted. In 450, the PC 130 may contact the provisioning engine 120 and the provisioning engine 120 may start provisioning as described above. In 460, the provisioning engine 120 may inform the user of a successful start to the provisioning, for example via a notification in a web browser. In 470, the provisioning engine 120 may configure the network device 150 as described above. In 480, the provisioning engine 120 may inform the user of a successful provisioning, for example via a notification in a web browser.

The systems and methods described above may provide at least the following features, as well as additional features described above.

1. Ability to remotely configure a network device via the internet with a cloud-based provisioning engine
2. Use of a USB key to enable automated provisioning of network device
3. Use of email URL link to activate automated provisioning of network device
4. Injection of boot agent onto network device via USB or internet connection
5. Use of a boot agent loaded onto network device to remotely connect to a cloud-based provisioning engine
6. Use of a cloud-sourced script loaded onto the network device to create a local event triggered by the network device event manager
7. Remote collection of information on network device to detect connection type and use a local initialization file to provision credentials to interface
8. Automatically determine if network device has a public or private IP address and configure communication back to the cloud-based provisioning engine
9. Automatic configuration updates via communication with cloud-based provisioning engine upon power on or hard reset of network device 10. Use of a scripts library (methods) to interact between the network device and the cloud-based provisioning engine While various embodiments have been described above, it should be understood that they have been presented by way of example and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments.

In addition, it should be understood that any figures which highlight the functionality and advantages are presented for example purposes only. The disclosed methodology and system are each sufficiently flexible and configurable such that they may be utilized in ways other than that shown.

Although the term "at least one" may often be used in the specification, claims and drawings, the terms "a", "an", "the", "said", etc. also signify "at least one" or "the at least one" in the specification, claims and drawings.

Finally, it is the applicant's intent that only claims that include the express language "means for" or "step for" be interpreted under 35 U.S.C. 112, paragraph 6. Claims that do not expressly include the phrase "means for" or "step for" are not to be interpreted under 35 U.S.C. 112, paragraph 6.

What is claimed is:

1. A method comprising: performing processing associated with loading, with a boot agent injection module in communication with a processor; a boot agent into a memory of a network device comprising the processor, the boot agent comprising executable code, and the network device not currently configured to connect a remote computer; and performing processing associated with a using a the boot agent to configure, with the network device, the network device to connect to the remote computer, wherein once configured, the network device is configured to connect to the remote computer after a future remote device restart without reconfiguring,
wherein performing processing associated with loading, with the boot agent injection module, the boot agent into the memory of the network device further comprises: performing processing associated with transferring, with the boot agent injection module the boot agent to the network device via a network connection;
wherein performing processing associated with loading, with the boot agent injection module, the boot agent into the memory of the network device further comprises: performing processing associated with sending, with the boot agent injection module, an HTML link to a computer in communicating with the network device via a network connection, the HTML link comprising a link to the boot agent.

2. The method of claim 1, wherein performing processing associated with loading, with a boot agent injection module, a boot agent into a memory of a network device further comprises:
performing processing associated with transferring, with the booth agent injection module, the boot agent to the network device via a USB connection.

3. The method of claim 1, wherein performing processing associated with using the boot agent to configure, with the network device, the network device to connect to a remote computer comprises:
performing processing associated with using the boot agent to analyze, with the network device, a property of the network device; and
performing processing associated with using the boot agent to configure, with the network device, the network device according to the property of the network device.

4. The method of claim 1, wherein performing processing associated with using the boot agent to configure, with the network device, the network device to connect to a remote computer comprises:
performing processing associated with sending, with the network device, a test message to the remote computer via network connection.

5. The method of claim 1, wherein performing processing associated with using the boot agent to configure, with the network device, the network device to connect to a remote computer comprises:
performing processing associated with storing, with the network device, configuration data into the memory of the network device, the configuration data enabling the network device to connect to the remote computer.

6. The method of claim 1, wherein performing processing associated with using the boot agent to configure, with the network device, the network device to connect to a remote computer comprises:
performing processing associated with using the boot agent to determine, with the network device, whether the network device is connected to the remote computer via a direct connection or an indirect connection.

7. The method of claim 1, wherein performing processing associated with using the boot agent to configure, with the network device, the network device to connect to a remote computer comprises:
performing processing associated with using the boot agent to configure, with the network device, the network device to communicate with the remote computer using a scripts library.

8. The method of claim 1, further comprising:
performing processing associated with loading, with the boot agent injection module; a boot agent update into the memory of the network device; and
performing processing associated with using the boot agent update to configure, with the network device, the network device to connect to the remote computer.

9. The method of claim 1, wherein the network device is configured to connect to the remote computer through ha local area network or wide area network.

10. A system comprising: a network device comprising a processor and a memory, the network device not currently configured to connect to a remote computer; and
a boot agent injection module in communication with a processor, the boot agent injection module comprising executable code and configured to perform processing associated with loading a boot agent into the memory of the network device;
wherein the network device is configured to perform processing associated with using the boot agent to configure the network device to connect to the remote computer, and wherein once configured, the network device is configured to connect to the remote computer after a future remote device restart without reconfiguring,
wherein the boot agent injection module is configured to perform processing associated with loading the boot agent into the memory of the network device by: performing processing associated with transferring the boot agent to the network device via a network connection, wherein the boot agent injection module is further configured to perform processing associated with loading the boot agent into the memory of a network device by: performing processing associated with sending an HTML link to a computer in communication with the network device via a network connection, the HTML link comprising a link to the boot agent.

11. The system of claim 10, wherein the boot agent injection module is configured to perform processing associated with loading the boot agent into a memory of a network device by:
performing processing associated with transferring the boot agent to the network device via a USB connection.

12. The system of claim 10, wherein performing processing associated with using the boot agent to configure, with the network device, the network device to connect to a remote computer comprises:
performing processing associated with using the boot agent to analyze, with the network device, a property of the network device; and
performing processing associated with using the boot agent to configure, with the network device, the network device according to the property of the network device.

13. The system of claim 10, wherein performing processing associated with using the boot agent to configure, with the network device, the network device to connect to a remote computer comprises:
performing processing associated with sending, with the network device, a test message to the remote computer via a network connection.

14. The system of claim 10, wherein the network device is configured to perform processing associated with using the boot agent to configure the network device to connect to a remote computer by:
performing processing associated with storing configuration data into the memory of the network device, the configuration data enabling the network device to connect to the remote computer.

15. The system of claim 10, wherein the network device is configured to perform processing associated with using the boot agent to configure the network device to connect to a remote computer by:
performing processing associated with using the boot agent to determine whether the network device is connected to the remote computer via a direct connection or an indirect connection.

16. The system of claim 10, wherein the network device is configured to perform processing associated with using the boot agent to configure the network device to connect to a remote computer by:
performing processing associated with using the boot agent to configure the network device to communicate with the remote computer using a scripts library.

17. The system of claim 10, wherein:
the boot agent injection module is further configured to perform processing associated with loading a boot agent update into the memory of the network device; and
the network device is further configured to perform processing associated with using the boot agent update to configure the network device to connect to the remote computer.

18. The system of claim 10, wherein the network device is configured to connect to the remote computer through a local area network or wide area network.

* * * * *